US011185180B2

(12) United States Patent
Albrecht et al.

(10) Patent No.: US 11,185,180 B2
(45) Date of Patent: Nov. 30, 2021

(54) PERSONAL ARTICLE HOLDER FOR MOBILE DEVICES

(71) Applicants: Frederick Nicholas Albrecht, Akron, OH (US); Frederick Steven Albrecht, Akron, OH (US)

(72) Inventors: Frederick Nicholas Albrecht, Akron, OH (US); Frederick Steven Albrecht, Akron, OH (US)

(*) Notice: Subject to any disclaimer, the term of this patent is extended or adjusted under 35 U.S.C. 154(b) by 0 days.

(21) Appl. No.: 16/810,203

(22) Filed: Mar. 5, 2020

(65) Prior Publication Data
US 2021/0274956 A1 Sep. 9, 2021

(51) Int. Cl.
*A47G 29/08* (2006.01)
*A47G 25/12* (2006.01)

(52) U.S. Cl.
CPC ............ *A47G 29/08* (2013.01); *A47G 25/12* (2013.01)

(58) Field of Classification Search
CPC .... A47G 29/08; A47G 25/12; A47G 23/0216; A47G 2023/0283; A47G 23/0203; A47G 23/0208; B60R 11/00; B60R 7/12; B62B 3/142; B62B 3/1472; B62B 3/1464; B62D 39/00
See application file for complete search history.

(56) References Cited

U.S. PATENT DOCUMENTS

| | | | | | |
|---|---|---|---|---|---|
| 2,426,113 | A | * | 8/1947 | Northcutt | B60R 7/12 |
| | | | | | 296/37.13 |
| 2,633,278 | A | * | 3/1953 | Muniz | B62B 3/1472 |
| | | | | | 224/411 |
| 2,941,769 | A | * | 6/1960 | Alpard | B62B 1/26 |
| | | | | | 248/111 |
| 3,081,126 | A | * | 3/1963 | Theberge | B60R 7/12 |
| | | | | | 296/37.1 |
| 3,096,960 | A | * | 7/1963 | Kinney | A47L 13/512 |
| | | | | | 248/113 |
| 5,938,091 | A | * | 8/1999 | Bergin | B62B 3/1472 |
| | | | | | 224/411 |
| 8,967,668 | B2 | * | 3/2015 | Bollmann | B60R 9/00 |
| | | | | | 280/769 |
| 9,120,496 | B1 | * | 9/2015 | Griffith | B62B 5/00 |
| 9,174,659 | B2 | * | 11/2015 | Stauff | B62B 5/067 |
| 9,706,850 | B2 | * | 7/2017 | Abu-Ulba | A47C 7/70 |
| 10,173,708 | B1 | * | 1/2019 | Bacallao | B62B 3/146 |
| 10,494,008 | B1 | * | 12/2019 | Scriba | B62B 3/1472 |
| 2003/0052464 | A1 | * | 3/2003 | McGuire | B62B 3/1472 |
| | | | | | 280/33.992 |
| 2006/0049591 | A1 | * | 3/2006 | Pennell | B62B 3/1468 |
| | | | | | 280/33.992 |
| 2006/0186621 | A1 | * | 8/2006 | Buckley, III | B62B 3/1464 |
| | | | | | 280/33.992 |

(Continued)

*Primary Examiner* — Jonathan Liu
*Assistant Examiner* — Devin K Barnett
(74) *Attorney, Agent, or Firm* — Cooper Legal Group, LLC

(57) ABSTRACT

One or more personal article holders and/or mobile structures to which personal article holders can be attached or are integrated into are provided. A personal article holder comprises an elongated body comprising a hollow interior and a first open end configured for allowing a personal article to be inserted into the hollow interior. The personal article holder comprises an attachment means configured to attach the personal article holder to a mobile device.

13 Claims, 17 Drawing Sheets

(56) References Cited

U.S. PATENT DOCUMENTS

| | | | |
|---|---|---|---|
| 2007/0029745 A1* | 2/2007 | Ursettie | B62B 3/102 |
| | | | 280/33.992 |
| 2015/0076199 A1* | 3/2015 | Granvle | B62B 3/1464 |
| | | | 224/411 |
| 2016/0096542 A1* | 4/2016 | Fukushima | B62B 3/1468 |
| | | | 224/411 |
| 2017/0258189 A1* | 9/2017 | Goldfinger | B62B 3/1464 |
| 2018/0009460 A1* | 1/2018 | Bacallao | B62B 3/1468 |
| 2019/0061798 A1* | 2/2019 | Bacallao | B62B 3/106 |
| 2020/0216131 A1* | 7/2020 | Samel | B62J 9/22 |
| 2020/0223466 A1* | 7/2020 | Sherman | B62B 3/144 |
| 2021/0213989 A1* | 7/2021 | Petrick | B62B 5/00 |

* cited by examiner

PERSONAL ARTICLE HOLDER FOR MOBILE DEVICES

BACKGROUND

A mobile device may comprise a shopping cart, a car, a truck, a walker or stroller (e.g., a walker with a seat), a baby stroller, a bike, a scooter, or any other type of device that may be mobile, such as where a user or motor may displace the device. In an example, a shopping cart, comprises a basket that is mounted onto a basket support structure, such as a support frame of the shopping cart. The basket support structure comprises a base frame that is mounted onto one or more wheel assemblies that allow the shopping cart to be displaced, such as to be pushed by a user or motor assembly of the shopping cart. The shopping cart may comprise any number of baskets, such as a single large basket, a smaller top basket and a larger bottom basket, etc. The user may store items within the one or more baskets, such as for subsequent purchase. This allows the user to transport more items than if the user had to carry the items. The shopping cart may comprise a seating structure within which one or more children may sit. For example, the shopping cart may comprise a plastic seating structure having a particular shape, such as the shape of a car (e.g., a red sports car, a blue police car, etc.), and may comprise a toy wheel and/or other components. The shopping cart may comprise a handle structure that can be utilized by a user to push and/or steer the shopping cart.

One example of a shopping cart is a push shopping cart. With the push shopping cart, a user manually pushes and steers the push shopping cart utilizing the handle structure. Another example of a shopping cart is a motorized shopping cart. The motorized shopping cart may comprise a seat attached to a vehicle frame. The vehicle frame may be attached to a wheel assembly that is driven by a motor attached to the motorized shopping cart. The motorized shopping cart may also comprise a basket into which the user may store items for subsequent purchase.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

A mobile device may comprise a shopping cart, a car, a truck, a walker or stroller (e.g., a walker with a seat), a baby stroller, a bike, a scooter, or any other type of device that may be mobile, such as where a user or motor may displace the device. In an example, a shopping cart may comprise a push shopping cart that a user manually pushes, a motorized shopping cart with a motor configured to move the motorized shopping cart, and/or a shopping cart with a plastic housing with one or more seats (e.g., a plastic housing shaped similar to that of a fire truck, police car, race car, etc. within which children may sit). The shopping cart may comprise one or more baskets within which the user may store items (e.g., a user within a grocery store may store items for purchase within a basket of the shopping cart). A basket may comprise a bottom basket frame, a front basket frame, a rear basket frame, a first side basket frame, and/or a second side basket frame. One or more of the basket frames may be attached to one another to form the basket. The basket may be mounted to a basket support structure.

The basket support structure may comprise a base frame mounted on one or more wheel assemblies. The basket support structure may comprise a handle structure operatively connected to the base frame for displacing the shopping cart using the one or more wheel assemblies. The shopping cart may comprise any number, size, and/or arrangement of baskets.

A user may be carrying a personal article, such as a cane, an umbrella, a coat, a purse, a diaper bag, or any other item or object. Accordingly, a personal article holder is provided for the shopping cart so that the user may secure the personal article using the personal article holder for transport using the shopping cart. The personal article holder comprises an elongated body. The elongated body may have a tubular shape, a cylindrical shape, a tapered shape, a square/rectangular tube shape, and/or any other type of shape. The elongated body comprises a hollow interior. The elongated body comprises a first open end (e.g., an opening at one end of the elongated body) configured for allowing a personal article, such as a cane or umbrella, to be inserted into the hollow interior. The first open end may be located at one end of the elongated body, and either a second open end (e.g., an opening allowing the personal article to protrude through the personal article holder) or a closed end (e.g., a closed end to stop the personal article from protruding through the elongated body, which may have one or more drain holes through which rain or other liquid can drain from the personal article holder) may be located at the other end of the elongated body. In an embodiment, the first open end may comprise a lip that extends out beyond one or more sidewalls of the elongated body, which may allow a handle of a cane or umbrella to rest on top of the lip instead of sliding into the hollow interior. In an embodiment, a hook may be mounted along one or more sides of the elongated body, which may allow the user to hang a purse, coat, or other type of personal item on the hook.

The personal article holder comprises an attachment means. The attachment means may be configured to attach the personal article holder to the shopping cart. In an embodiment, the personal article holder and/or the attachment means are integrated into and are part of the shopping cart (e.g., the personal article holder may be welded, as the attachment means, to and part of the basket). In another embodiment, the personal article holder can be attached to and removed from the shopping cart using the attachment means. The personal article holder may comprise any number, types, and/or combinations thereof of attachment means, such as a zip tie, Velcro, a snap, a clasp, a clamp, rope, string, a strap, a magnet, a clip, a button, a chain, an adhesive, a bracket, a hook, and/or other mechanisms for attaching an object to another object and/or combinations of mechanisms. In an example, a first zip tie and a second zip tie may attach the personal article holder to the shopping cart by attaching and securing the elongated body of the personal article holder to the basket of the shopping cart. The one or more attachment means may be connected/secured to the elongated body by looping through one or more openings within the elongated body. For example, a zip tie may loop into a first opening of the elongated body, through the hollow interior, and out a second opening of the elongated body. The zip tie may loop and be secured around vertical and/or horizontal bars of the basket (e.g., a snap, button, knot, zip tie locking lever, or other attachment mechanisms may secure the zip tie or other attachment means around a portion of the basket).

In an embodiment, an inside surface of the elongated body is smooth. In another embodiment, the inside surface of the elongated body is not smooth, such as where the elongated body comprises a plurality of gripping structures (e.g., rubber ribs/rings or nubs) positioned radially around the hollow interior and being longitudinally spaced from one another. The gripping structures may help secure the personal article inside the personal article holder.

The personal article holder may be attached to various portions of the shopping cart by the one or more attachment means. The personal article holder may be attached to an inside of the basket of the shopping cart or to an outside of the basket of the shopping cart. The personal article holder may be attached to one or more of the front side basket frame, the rear side basket frame, the first side basket frame, the second side basket frame, and/or the basket support structure. The personal article holder may be attached to the handle structure. The personal article holder may be attached to the plastic housing comprising one or more seats within which children may sit. The personal article holder may be attached vertically, horizontally, or at an angle to the shopping cart.

The personal article holder may be attached to a variety of mobile devices, such as attached to an inside a vehicle (e.g., a car, a bus, a truck, etc.), outside the vehicle, a walker/stroller, a baby stroller, a bike, a scooter, or other mobile device. One or more attachment means may be used to attach the personal article holder to a mobile device, or the personal article holder may be integrated into and is a part of the mobile device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
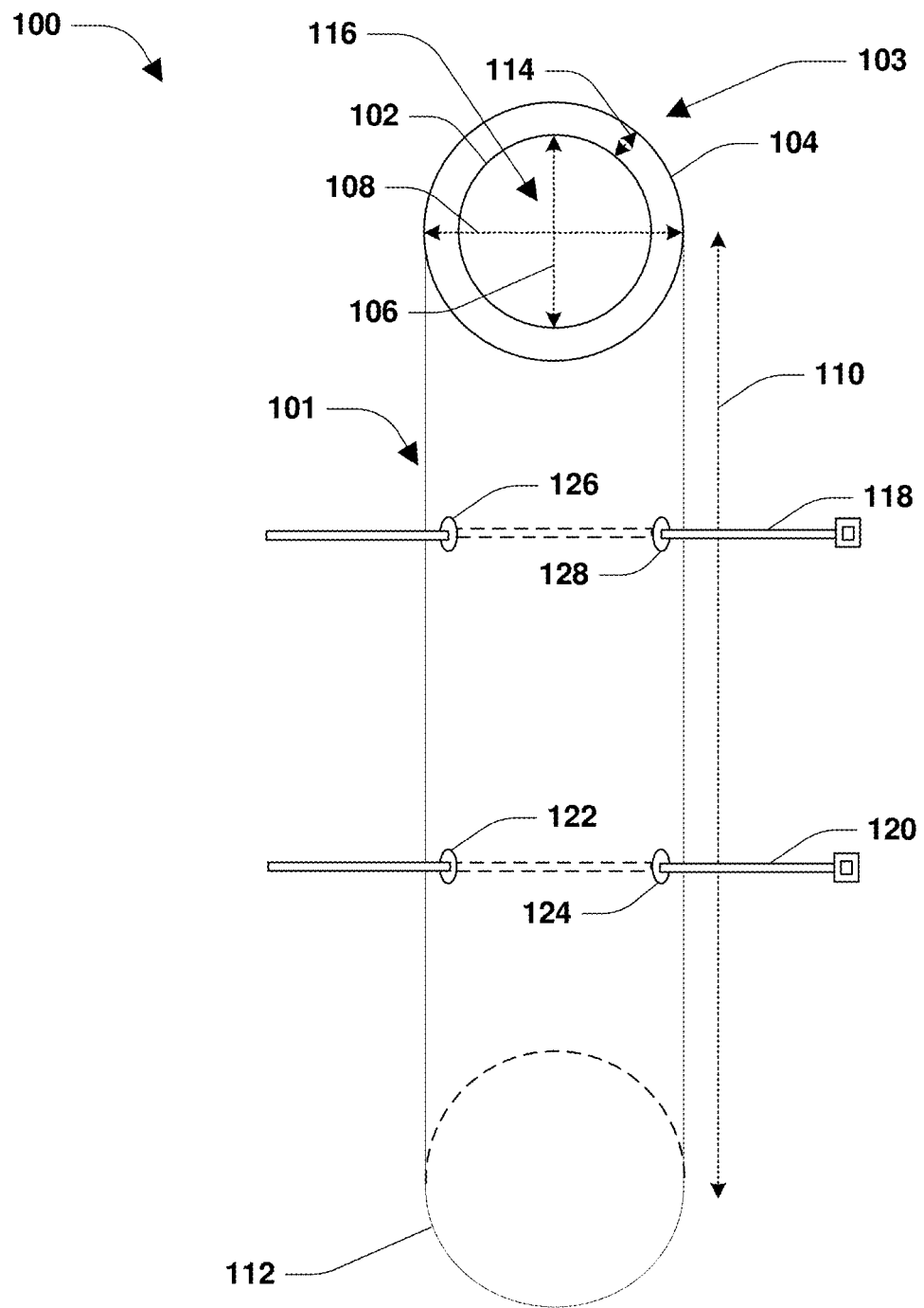
FIG. 1 is a component block diagram illustrating an exemplary personal article holder.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A mobile device may comprise a shopping cart, a car, a truck, a walker or stroller (e.g., a walker with a seat), a baby stroller, a bike, or any other type of device that may be mobile, such as where a user or motor may displace the device. In an example, a business or organization may provide shopping carts for users to carry items around, such as items for purchase within a grocery store or other type of store. This allows the users to transport more items than what the users would otherwise be able to carry in their hands or with a carry along basket. Users may bring personal articles, such as a cane, an umbrella, a purse, a diaper bag, a coat, etc., with them into a location where shopping carts are available to use for carrying items. It may be cumbersome for the user to use and/or carry a personal item, such as carrying an umbrella, while operating a shopping cart (e.g., the user's hands may be busy steering and pushing the shopping cart). If the user attempts to store the personal article within the shopping cart, the personal article may roll around, bump around, jostle around, and/or fall out because the shopping cart may lack a means to securely hold the personal article. Furthermore, storing the personal article within the shopping cart consumes valuable space that could otherwise be used to store and transport items.

Accordingly, as provided herein, a personal article holder is provided for a shopping cart. The personal article holder comprises an elongated body (e.g., a cylindrical tube, a rectangular tube, etc.) having one or more sides defining a hollow interior. The elongated body comprises an open end configured to allow a personal article, such as a cane, an umbrella, or other types of objects, to be inserted into and/or secured within the hollow interior. In an embodiment, the personal article holder comprises an attachment means configured to attach, such as removably attach, the personal article holder to a shopping cart. In another embodiment, the personal article holder is integrated into and is a part of the shopping cart (e.g., the personal article holder is part of a basket, such as welded onto the basket or formed from a same plastic mold as a plastic basket). Accordingly, a user may insert the personal article, such as a cane, through the open end of the elongated body and into the hollow interior. In this way, the personal article is securely held by the personal article holder attached to the shopping cart.

The personal article holder may be attached to a variety of mobile devices, such as attached to an inside of a vehicle (e.g., a car, a bus, a truck, etc.), outside the vehicle, a walker/stroller, a baby stroller, a bike, a scooter, or other mobile device. One or more attachment means may be used to attach the personal article holder to a mobile device, or the personal article holder may be integrated into and is a part of the mobile device.

FIG. 1 illustrates an embodiment of a personal article holder 100. The personal article holder 100 comprises an elongated body 101. In an embodiment, the elongated body 101 has a length represented by a first dashed line 110. In an example, the length is between about 6 inches and about 3 feet. In another example, the length is between about 8 inches and about 16 inches. In yet another example, the length is about 12 inches. It may be appreciated that the elongated body 101 may have any length suitable for receiving and holding a particular type of personal article. The elongated body 101 is defined by an outside sidewall 104 and an inside sidewall 102. The elongated body 101 comprises a first end 103 at one end of the elongated body 101 and a second end 112 at an opposite end of the elongated body 101. The first end 103 may be an open end (e.g., a hole defined within the inside sidewall 102 of the elongated body 101). In an embodiment, the second end 112 is an open end (e.g., a hole such that a portion of a personal article could protrude through the second end 112). In another embodiment, the second end 112 is a closed end, such that the personal article would not protrude though the closed end, but would rest on the closed end. In an example, the closed end may comprise one or more drain openings, such as to drain rain water or other liquids from the personal article holder 100. In an embodiment, the elongated body 101 may have a tubular/cylindrical shape.

In an embodiment, the elongated body 101 has a thickness represented by a second dashed line 114. In an example, the thickness is between about one-tenth of an inch and about 3 inches. In an example, the thickness is about a half of an inch. It may be appreciated that the elongated body 101 may have any thickness for securely holding a personal article. The outside sidewall 104 may have a diameter represented by a third dashed line 108. In an example, the diameter of the outside sidewall 104 may be between about 1 inch and 7 inches. In another example, the diameter of the outside sidewall 104 may be about 2.5 inches. It may be appreciated that the outside sidewall 104 of the elongated body 101 may have any diameter length. The inside sidewall 102 may have a diameter represented by a fourth dashed line 106. In an example, the diameter of the inside sidewall 102 may be between about 1 inch and 7 inches. In another example, the diameter of the inside sidewall 102 may be about half an inch. It may be appreciated that the inside sidewall 102 of the elongated body 101 may have any diameter suitable for defining a hollow interior 116 into which a personal article could be received.

The elongated body 101 may be comprised of various types of materials, such as a rigid material, a flexible material, etc. In an example, the elongated body 101 may be comprised of plastic, wood, metal such as aluminum, rubber, or any other material or combination thereof. In an embodiment, a label may be affixed to the elongated body 101, such as the entire elongated body 101 or a portion thereof. The label may be part of the elongated body 101 or may be affixed to the elongated boy 101 by an adhesive or other means. The label may comprise a logo and/or other information, such as a name of a store, a QR code that can be scanned using a mobile device to open an application associated with the store, a phone number of the store, a website address of the store, ink whose color changes based upon temperature to indicate a current temperature, and/or a wide variety of other information and/or imagery.

The personal article holder 100 comprises one or more attachment means, such as a first attachment means 118 and a second attachment means 120. It may be appreciated that the personal article holder 100 may comprise a single attachment means or any other number of attachment means. A wide variety of attachment means may be utilized, such as a zip tie as illustrated by FIG. 1, Velcro, a snap, a clasp, a clamp, rope, string, a strap, a magnet, a clip, a button, a chain, a bracket, a hook, and/or other mechanisms for attaching an object to another object and/or combinations of mechanisms (e.g., snaps attached to straps; string attached using hooks; etc.). An attachment means may comprise a variety of materials, such as plastic, metal, cloth, magnet material, an adhesive, etc. As will be further described in relation to FIGS. 3A-5B, the one or more attachment means may be configured to attach, such as permanently attach or removably attach, the personal article holder 100 to various types of shopping carts.

The first attachment means 118 may be secured to the elongated body 101 using a first opening 126 and a second opening 128 through the elongated body 101. For example, the first attachment means 118 may loop through the first opening 126, through the inside of the elongated body 101, and out through the second opening 128. It may be appreciated that an attachment means may be secured to and/or built into the elongated body 101 through a variety of means, such as glue, bolts, screws, looping through holes, an adhesive, a magnet, etc. The second attachment means 120 may be secured to the elongated body 101 using a third opening 122 and a fourth opening 124 through the elongated body 101. For example, the second attachment means 120 may loop through the third opening 122, through the inside of the elongated body 101, and out through the fourth opening 124. The first attachment means 118 and/or the second attachment means 120 may wrap around a portion of the shopping cart (e.g., wrap around vertical bars of a basket of the shopping cart) and secure the personal article holder 100 to the shopping cart (e.g., a zip tie may be zipped and tied around the vertical bars; a chain or rope may be wrapped and tied around the vertical bars; etc.). In an embodiment of attaching the personal article holder 100 to a shopping cart, the personal article holder 100 may be attached to or integrated into a plastic housing (e.g., a plastic housing shaped as a police car, a fire truck, a race car, etc.) comprising one or more seats within which children may be seated (e.g., the personal article holder 100 may be attached to or formed from a same plastic mold as the plastic housing).

The personal article holder 100 may be attached to a variety of mobile devices, such as attached to an inside of a vehicle (e.g., a car), outside the vehicle, a walker/stroller, a baby stroller, a bike, a scooter, or other mobile device. One or more attachment means may be used to attach the personal article holder 100 to a mobile device, or the personal article holder 100 may be integrated into and is a part of the mobile device.

Figure 2:
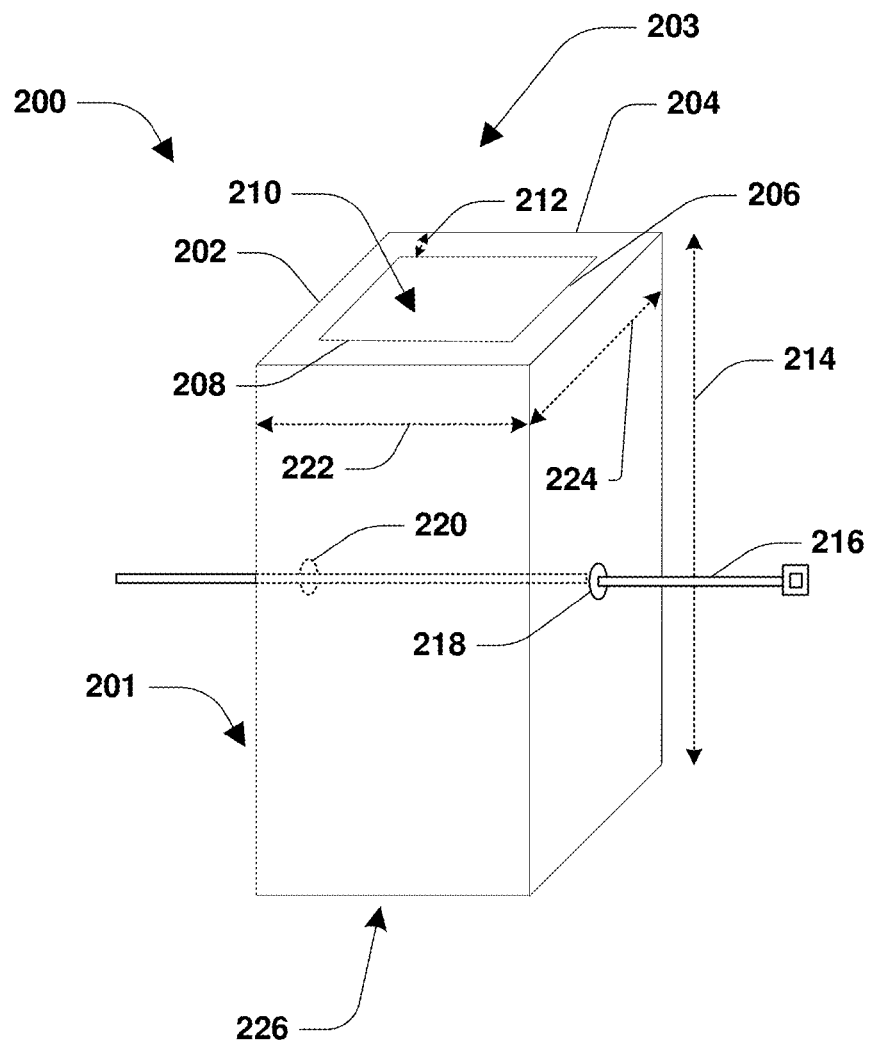
FIG. 2 is a component block diagram illustrating an exemplary personal article holder.

FIG. 2 illustrates an embodiment of a personal article holder 200. The personal article holder 200 comprises an elongated body 201. In an embodiment, the elongated body 201 has a length represented by a first dashed line 214. In an example, the length is between about 6 inches and about 3 feet. In another example, the length is between about 8 inches and about 16 inches. In yet another example, the length is about 12 inches. It may be appreciated that the elongated body 201 may have any length suitable for receiving and holding a particular type of personal article. The elongated body 201 has a width represented by a second dashed line 222. In an example, the width is between about 2 inches and about 9 inches. It may be appreciated that the elongated body 201 may have any width. The elongated body 201 has a depth represented by a third dashed line 224. In an example, the depth is between about 2 inches and about 9 inches. It may be appreciated that the elongated body 201 may have any depth. The elongated body 201 may have a thickness between an outside sidewall and an inside sidewall represented by a fourth dashed line 212. In an example, the thickness is between about one-tenth of an inch and 5 inches. It may be appreciated that the elongated body 201 may have any thickness.

The elongated body 201 is defined one or more outside sidewalls (e.g., 4 outside sidewalls including a first outside sidewall 202, a second outside sidewall 204, a third outside sidewall, and a fourth outside sidewall). In this way, the elongated body 201 has a square or rectangular tube shape. A hollow interior 210 of the elongated body 201 is defined by one or more inside sidewalls (e.g., 4 inside sidewalls including a first inside sidewall 208, a second inside sidewall 206, a third inside sidewall, and a fourth inside sidewall). The elongated body 201 comprises an open end 203 configured for allowing a personal article to be inserted into the hollow interior 210.

The personal article holder 200 comprises an attachment means 216. The attachment means 216 is secured to the elongated body 201 by looping through a first opening 220, through the hollow interior 210, and out through a second opening 218. The first opening 220 and the second opening 218 may be located on the same sidewall or different sidewalls (e.g., opposite sidewalls as depicted by FIG. 2) with respect to each other. It may be appreciated that the personal article holder 200 may comprise any number of attachment means. As will be further described in relation to FIGS. 3A-5B, the attachment means may be configured to attach, such as permanently attach or removably attach, the personal article holder 200 to a shopping cart. A bottom side 226 of the personal article holder 200 may comprise an open end to allow a personal article to protrude through or a closed end configured to stop the personal article from protruding through.

The personal article holder 200 may be attached to a variety of mobile devices, such as attached to an inside of a vehicle (e.g., a car, a truck, a bus, etc.), outside the vehicle, a walker/stroller, a baby stroller, a bike, a scooter, or other mobile device. One or more attachment means may be used to attach the personal article holder 200 to a mobile device, or the personal article holder 200 may be integrated into and is a part of the mobile device.

Figure 3A:
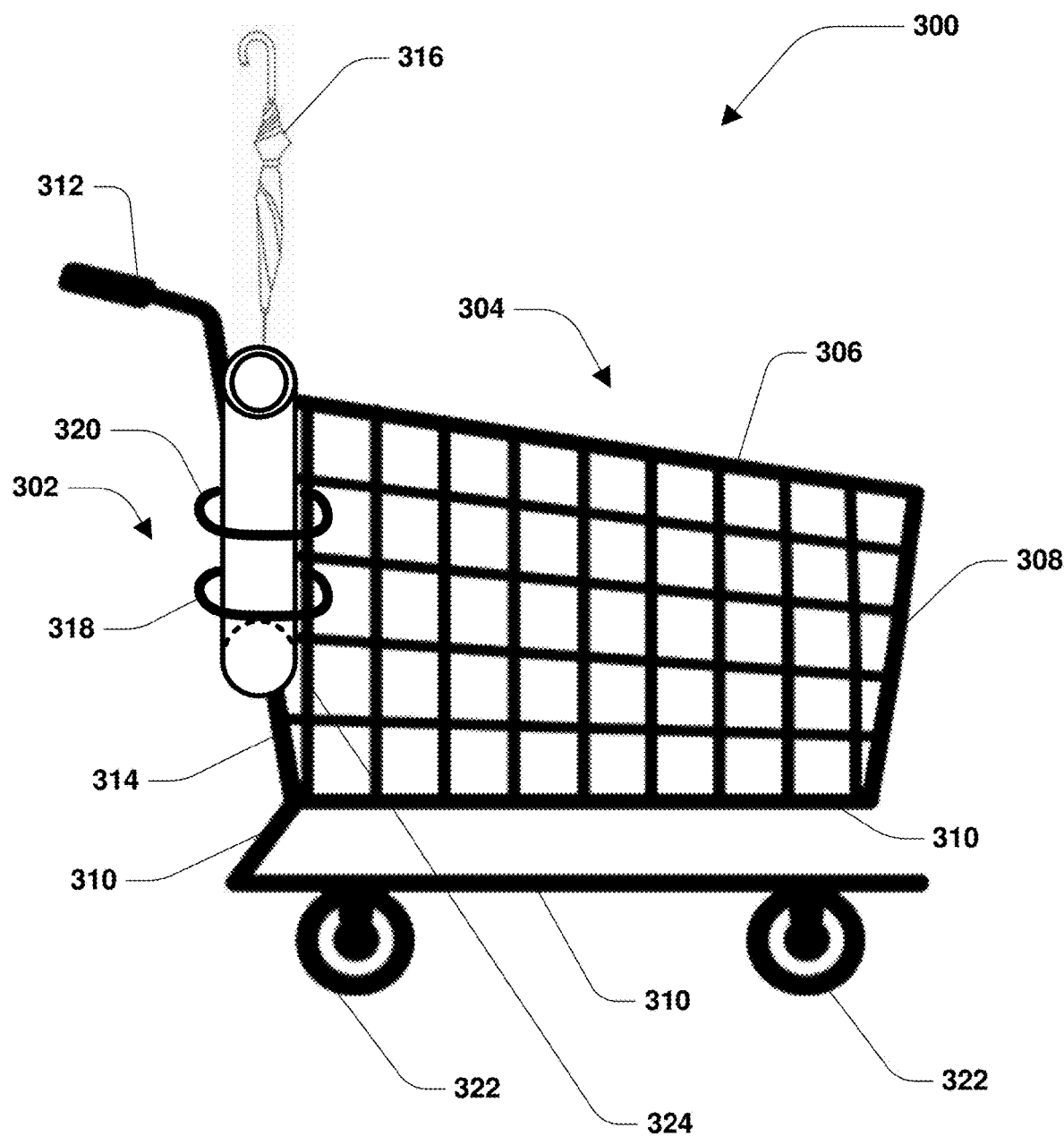
FIG. 3A is a component block diagram illustrating an exemplary personal article holder attached to a rear side of a shopping cart.

FIG. 3A illustrates an embodiment of a personal article holder 302 attached to a shopping cart 300. The shopping cart 300 may comprise a basket 304. The basket 304 may comprise a front basket frame 308, a rear basket frame 314, a first side basket frame 306, a second side basket frame, etc. The shopping cart 300 may comprise a basket support structure 310 on which the basket 304 is mounted. The basket support structure 310 comprises a base frame mounted onto one or more wheel assemblies 322. The basket support structure 310 comprises a handle structure 312 operatively connected to the base frame for displacing (e.g., moving, steering, etc.) the shopping cart 300. In an embodiment, the shopping cart 300 depicts a pushing shopping cart that can be manually pushed and steered by a user. It may be appreciated that the personal article holder 302 may be mounted to any type of shopping cart, such as a motorized shopping cart with a motor configured to power and displace/move the motorized shopping cart, a shopping cart with a plastic housing comprising one or more seats such as seats in which children may be seated, etc.

The personal article holder 302 may be attached to the shopping cart 300 at various locations, such as inside the basket 304, outside the basket 304, to the handle structure 312, to the basket support structure 310, and/or a combination thereof. For example, the personal article holder 302 is attached to the first side basket frame 306 and/or the rear basket frame 314 using a first attachment means 320 (e.g., a first strap that is secured by snaps) and/or a second attachment means 318 (e.g., a second strap that is secured by snaps or a different type of attachment means than the first attachment means such as Velcro). It may be appreciated that any number of attachment means and/or types or combination of types of attachment means (e.g., a strap and a zip tie; an adhesive and a magnet; etc.) may be utilized.

The first attachment means 320 may loop around one or more portions of the basket 304, such as a vertical bar 324, in order to attach the personal article holder 302 to the shopping cart 300 (e.g., the first strap may be secured around the vertical bar 324 using snaps or other affixation means, such as Velcro, a button, a knot, an adhesive, etc.). Similarly, the second attachment means 318 may loop around one or more portions of the basket 304, such as the vertical bar 324, in order to attach the personal article holder 302 to the shopping cart 300. In an embodiment, the personal article holder 302 may be removably attached to the shopping cart 300, such that the personal article holder 302 may be removed/detached from the shopping cart 300. In another embodiment, the personal article holder 302 may be integrated into the shopping cart 300, such as welded onto the basket 304 such that the attachment means of the personal article holder 302 are part of the shopping cart 300. In this way, a user of the shopping cart 300 may insert a personal article 316, such as an umbrella or cane, through an open end and into a hollow interior of the personal article holder 302.

Figure 3B:
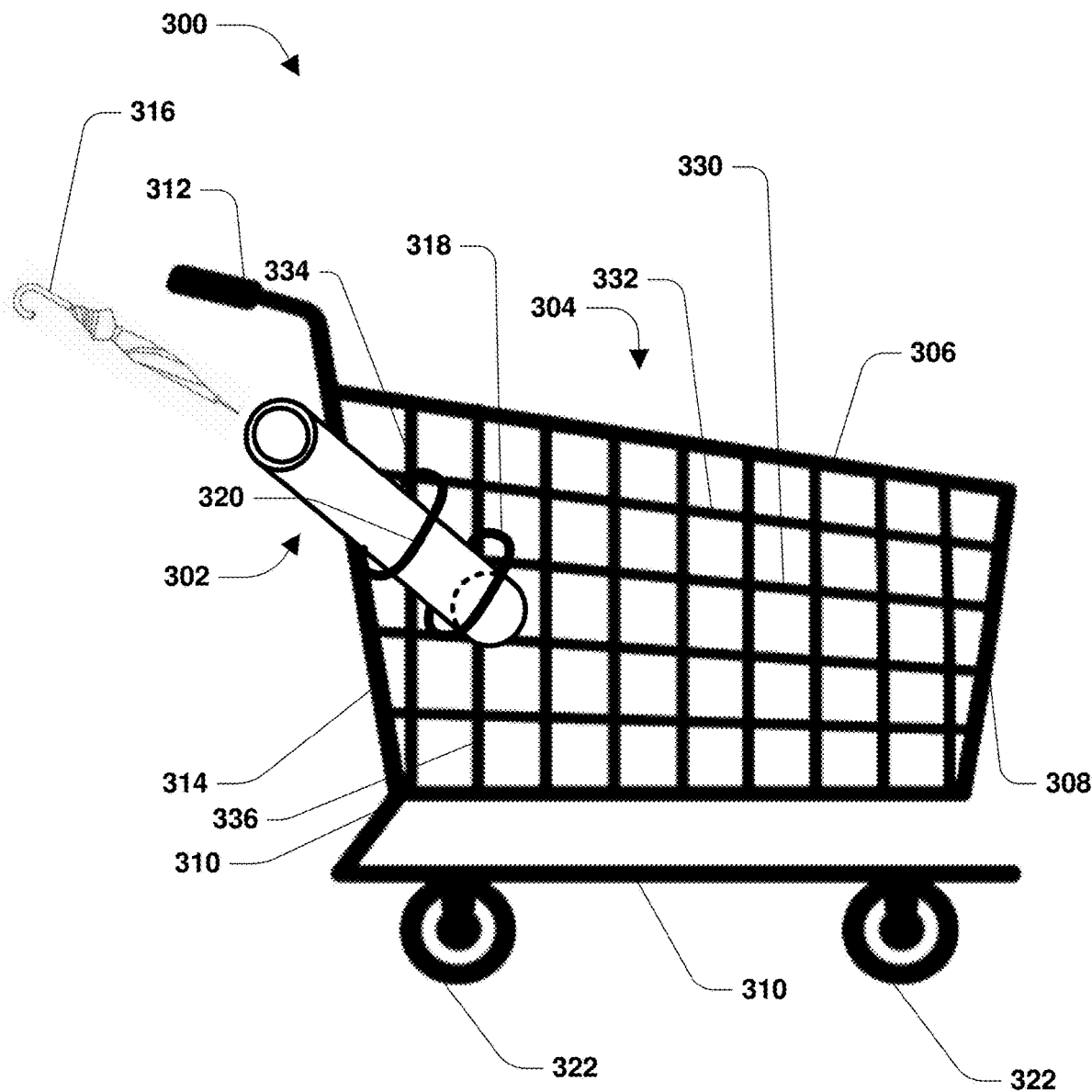
FIG. 3B is a component block diagram illustrating an exemplary personal article holder attached to a first side of a shopping cart at an angle.

It may be appreciated that the personal article holder 302 may be attached to the shopping cart 300 at various locations and/or angles. For example, the personal article holder 302 may be attached to the shopping cart 300 at an angle to allow for easier insertion and extraction of the personal article 316, as illustrated by FIG. 3B. The first attachment means 320 may loop around a vertical bar 334, a horizontal bar 332, a horizontal bar 330, and/or other bars or portions of the basket 304 to secure the personal article holder 302 to the shopping cart 300 at the angle. The second attachment means 318 may loop around a vertical bar 336, the horizontal bar 330, and/or other bars or portions of the basket 304 to secure the personal article holder 302 to the shopping cart 300 at the angle. In this way, the user of the shopping cart 300 may insert the personal article 316, such as the umbrella, through the open end and into the hollow interior of the personal article holder 302 at the angle.

Figure 3C:
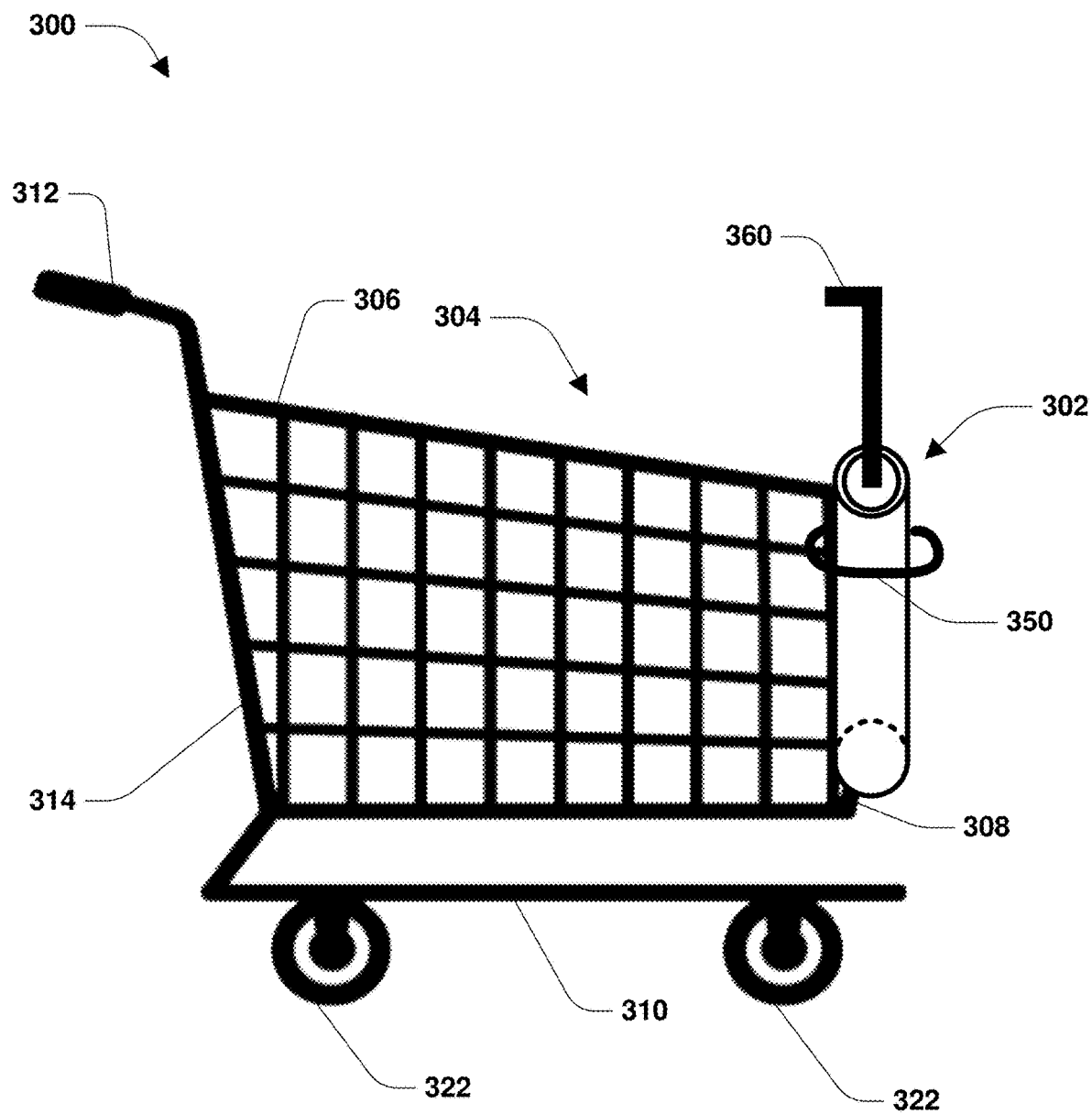
FIG. 3C is a component block diagram illustrating an exemplary personal article holder attached to a front side of a shopping cart.

In another example, the personal article holder 302 may be attached to the front basket frame 308 of the basket 304 using a single attachment means 350, as illustrated by FIG. 3C. In this way, a user may insert a personal article 360, such as a cane, through the open end and into the hollow interior of the personal article holder 302 located at the front of the shopping cart 300.

Figure 4A:
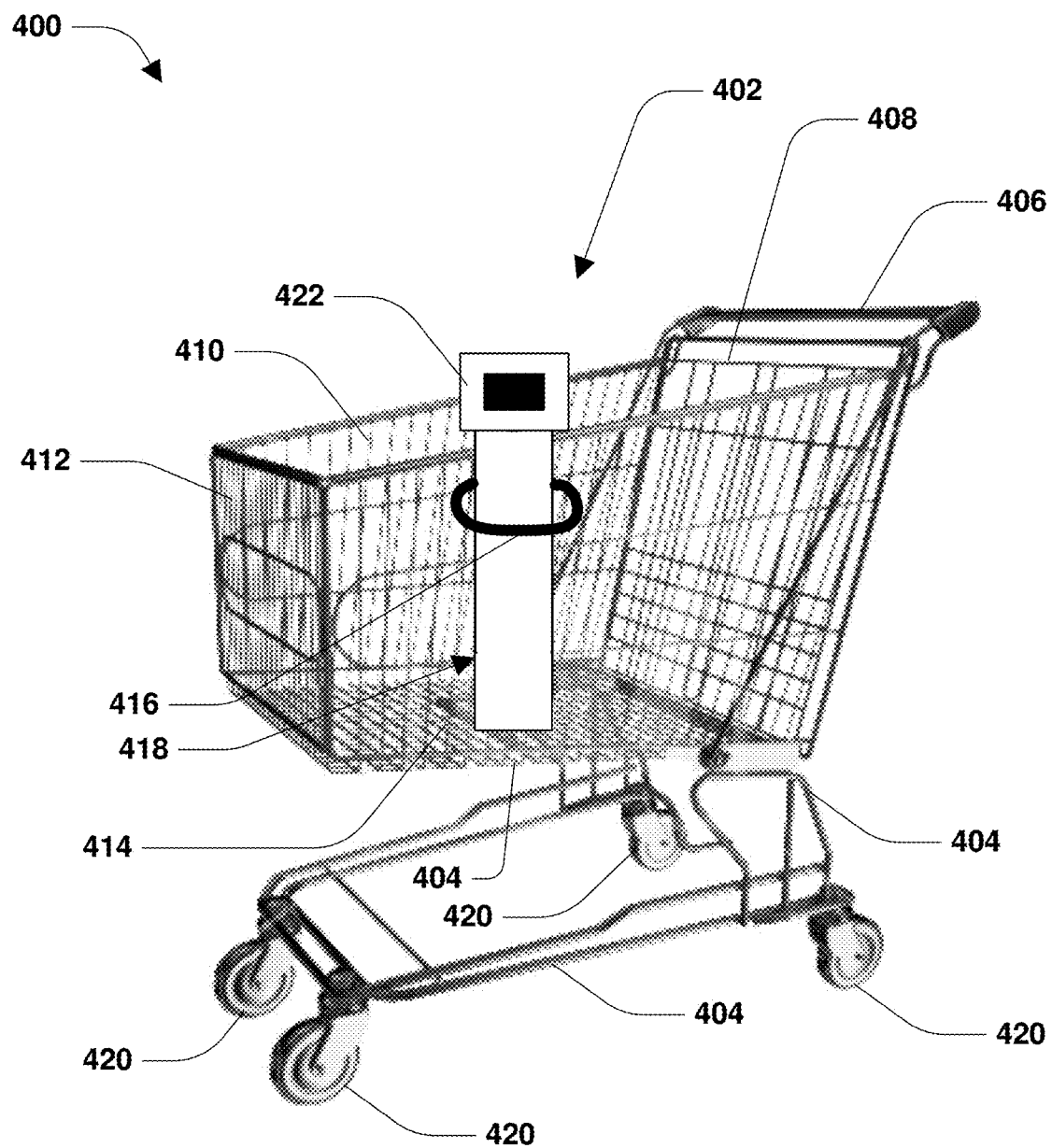
FIG. 4A is a component block diagram illustrating an exemplary personal article holder attached to a first side of a shopping cart.

FIG. 4A illustrates an embodiment of a personal article holder 418 attached to a shopping cart 400. The shopping cart 400 may comprise a basket 402. The basket 402 may comprise a front basket frame 412, a rear basket frame 408, a first side basket frame 414, a second side basket frame 410, etc. The shopping cart 400 may comprise a basket support structure 404 on which the basket 402 is mounted. The basket support structure 404 comprises a base frame mounted onto one or more wheel assemblies 420. The basket support structure 404 comprises a handle structure 406 operatively connected to the base frame for displacing (e.g., moving, steering, etc.) the shopping cart 400. In an embodiment, the shopping cart 400 depicts a push shopping cart that can be manually pushed and steered by a user. It may be appreciated that the personal article holder 418 may be mounted to any type of shopping cart, such as a motorized shopping cart with a motor configured to power and displace/move the motorized shopping cart, a shopping cart with a plastic housing comprising one or more seats such as seats in which children may be seated (e.g., the personal article holder 418 may be attached to or formed as part of the plastic housing), etc.

Figure 4B:
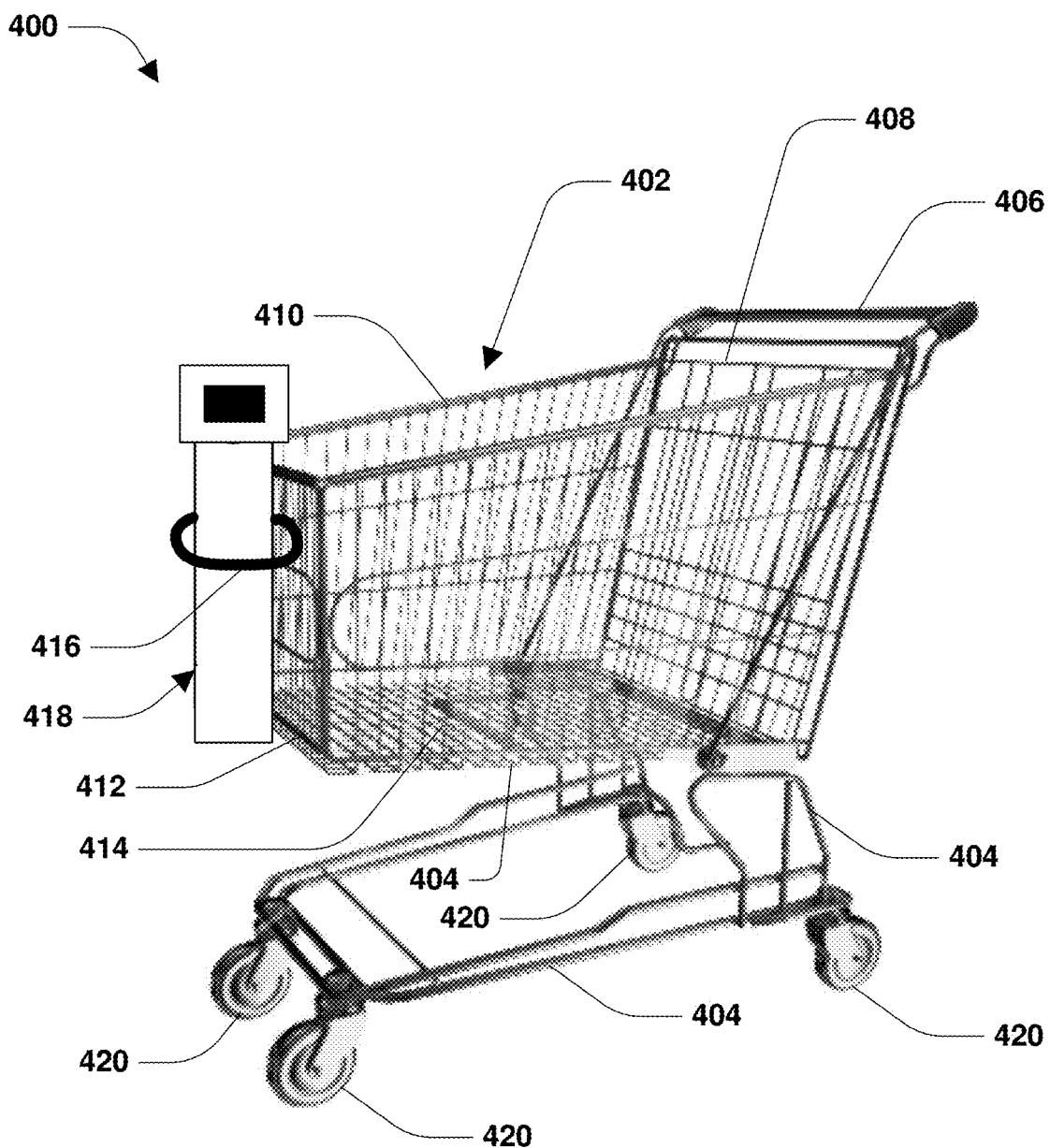
FIG. 4B is a component block diagram illustrating an exemplary personal article holder attached to a front side of a shopping cart.

The personal article holder 418 may comprise an elongated body having a square/rectangular tubular shape with a lip 422 overhanging the elongated body, such that the handle of a cane or umbrella may rest on the lip 422. The personal article holder 418 may be attached to the shopping cart 400 at various locations, such as inside the basket 402, outside the basket 402, to the handle structure 406, to the basket support structure 404, and/or a combination thereof. For example, the personal article holder 418 is attached to the first side basket frame 414 by a single attachment means 416 (e.g., a zip tie). It may be appreciated that any number of attachment means and/or types or combination of types of attachment means (e.g., a strap and a zip tie; an adhesive and a magnet; etc.) may be utilized. The single attachment means 416 may loop around one or more portions of the basket 402, such as one or more horizontal and/or vertical bars, in order to attach the personal article holder 418 to the shopping cart 400. In this way, a user of the shopping cart 400 may insert a personal article, such as an umbrella or cane, through an open end and into a hollow interior defined within the lip 422 and elongated body of the personal article holder 418. It may be appreciated that the personal article holder 418 may be attached to the shopping cart 400 at various locations and/or angles. For example, the personal article holder 418 may be attached to the front basket frame 412 of the shopping cart 400, as illustrated by FIG. 4B.

Figure 5A:
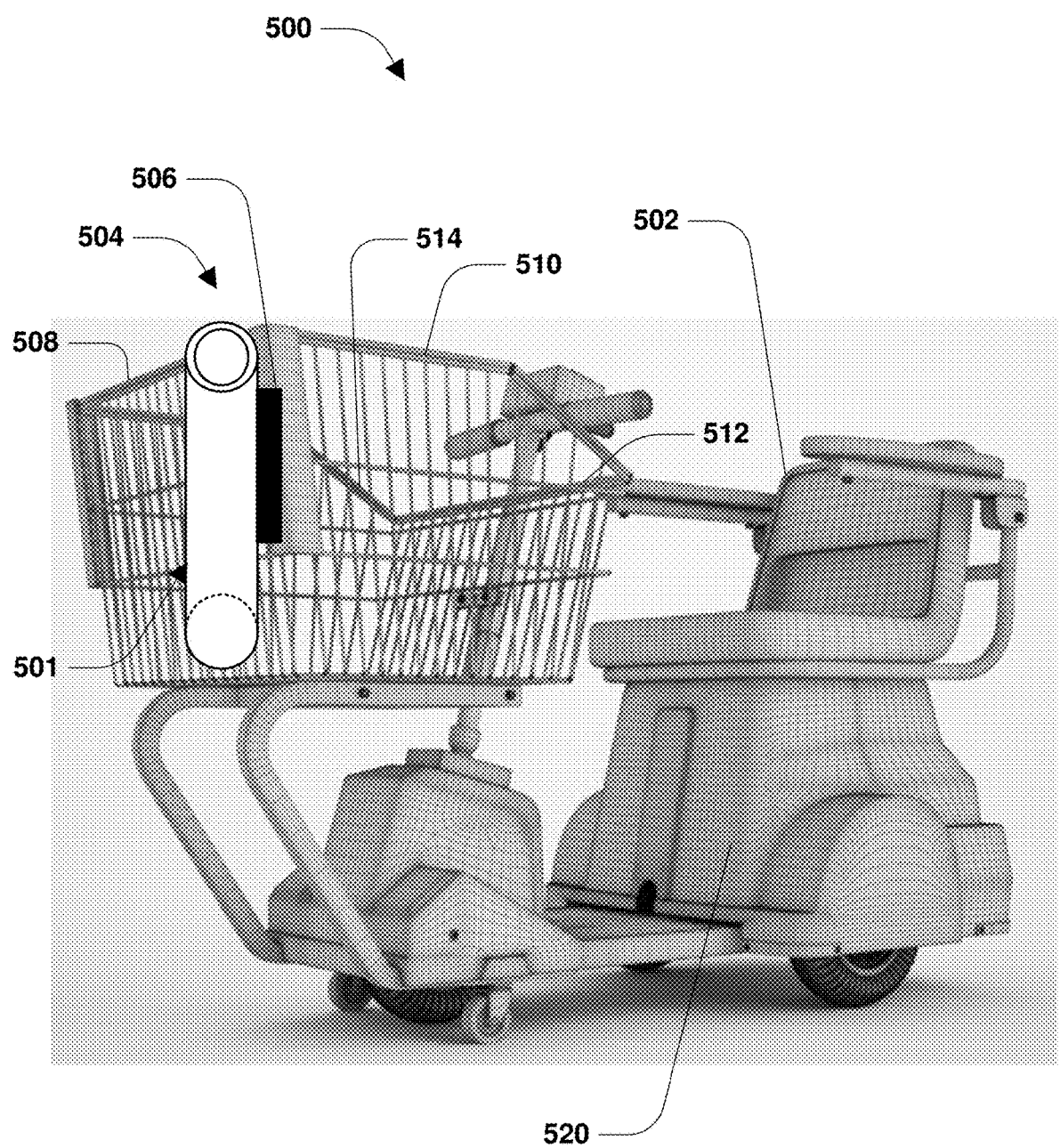
FIG. 5A is a component block diagram illustrating an exemplary personal article holder attached to a front side of a motorized shopping cart.

FIG. 5A illustrates an embodiment of a personal article holder 501 attached to a motorized shopping cart 500. The motorized shopping cart 500 may comprise a basket 504. The basket 504 may comprise a front basket frame 508, a rear basket frame 512, a first side basket frame 510, a second side basket frame 514, etc. The motorized shopping cart 500 may comprise a seat 502 in which a user may sit for driving the motorized shopping cart 500. The motorized shopping cart 500 may comprise a motor within a body 520 of the motorized shopping cart 500, which is configured to power and displace/move the motorized shopping cart 500.

Figure 5B:
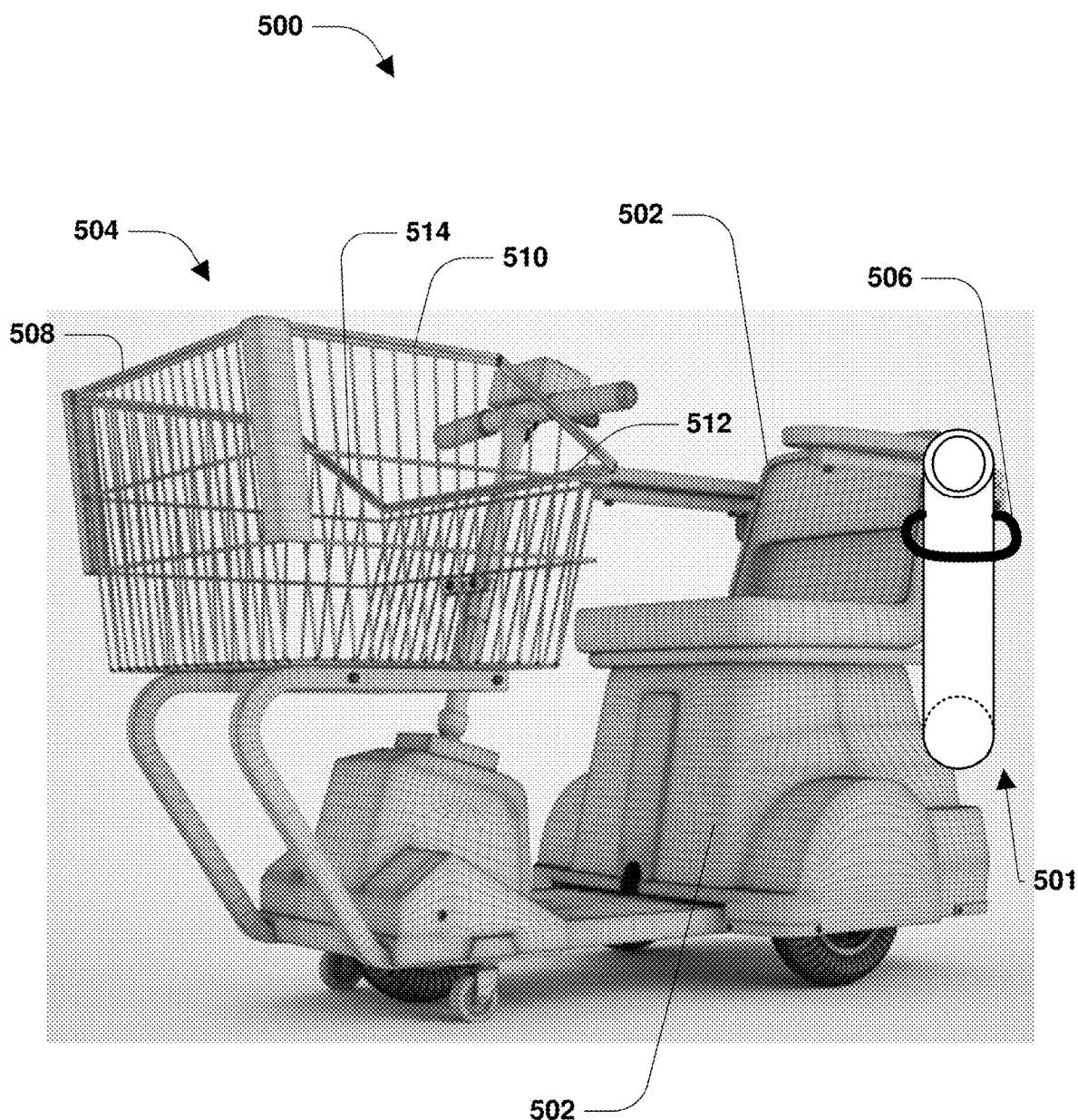
FIG. 5B is a component block diagram illustrating an exemplary personal article holder attached to a seat structure of a motorized shopping cart.
Figure 5C:
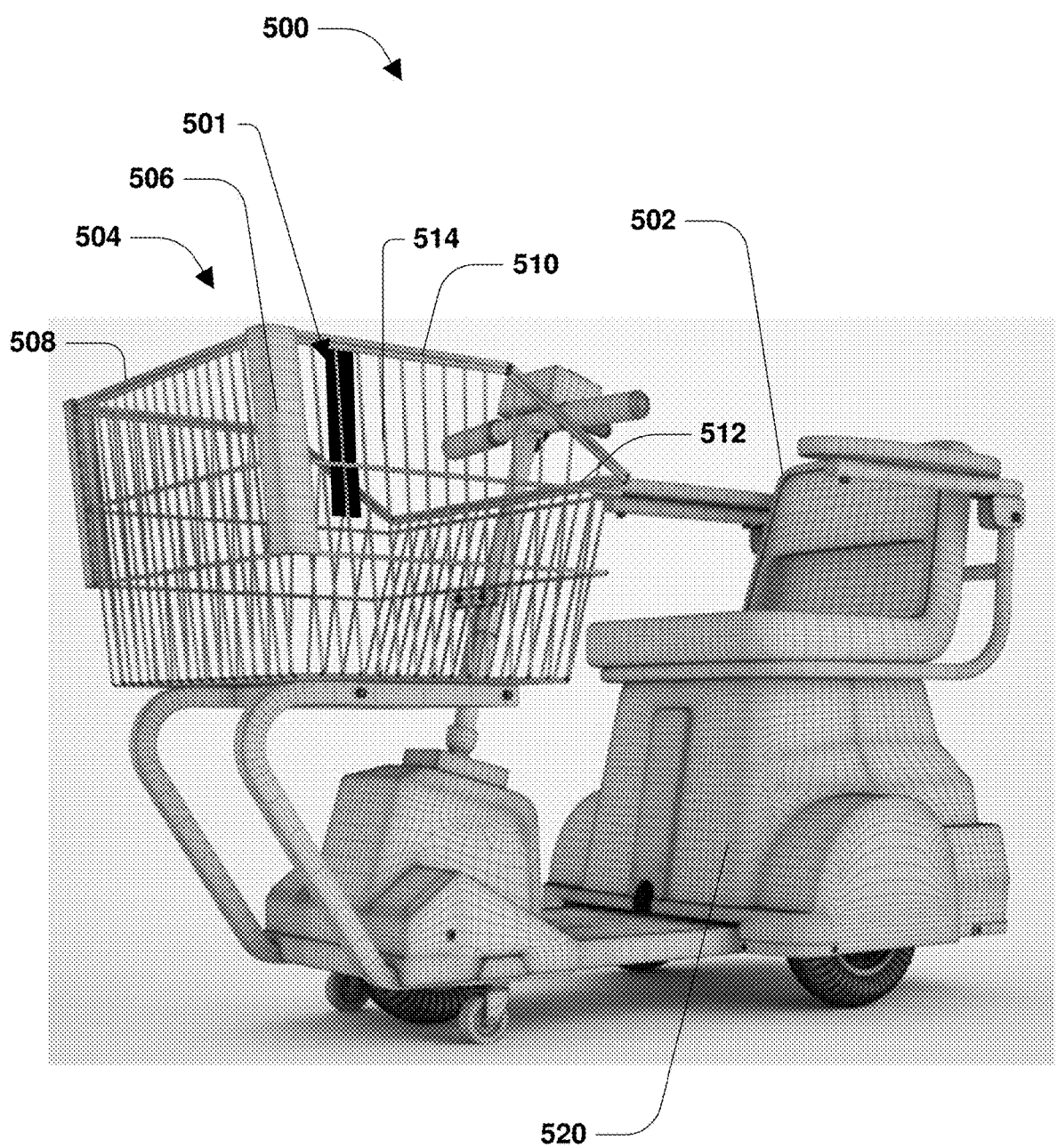
FIG. 5C is a component block diagram illustrating an exemplary personal article holder attached to an inside of a basket of a motorized shopping cart.

The personal article holder 501 may be attached to the motorized shopping cart 500 at various locations, such as inside the basket 504, outside the basket 504, to the seat 502, to the body 520, and/or a combination thereof. For example, the personal article holder 501 is attached to the front basket frame 508 using an attachment means 506 (e.g., an adhesive strip, a magnetic strip, Velcro, a clamp/clasp that is attached to the personal article holder 501 and clamps/clasps around the basket 504, etc.). It may be appreciated that the personal article holder 501 may be attached to the motorized shopping cart 500 at various locations and/or angles. For example, the personal article holder 501 may be attached to the seat 502, an arm of the seat 502, and/or the body 520 of the motorized shopping cart 500, as illustrated by FIG. 5B. It may be appreciated that the personal article holder 501 may be attached to any part of the motorized shopping cart 500, such as to the inside of the basket 504, as illustrated by FIG. 5C.

Figure 6:
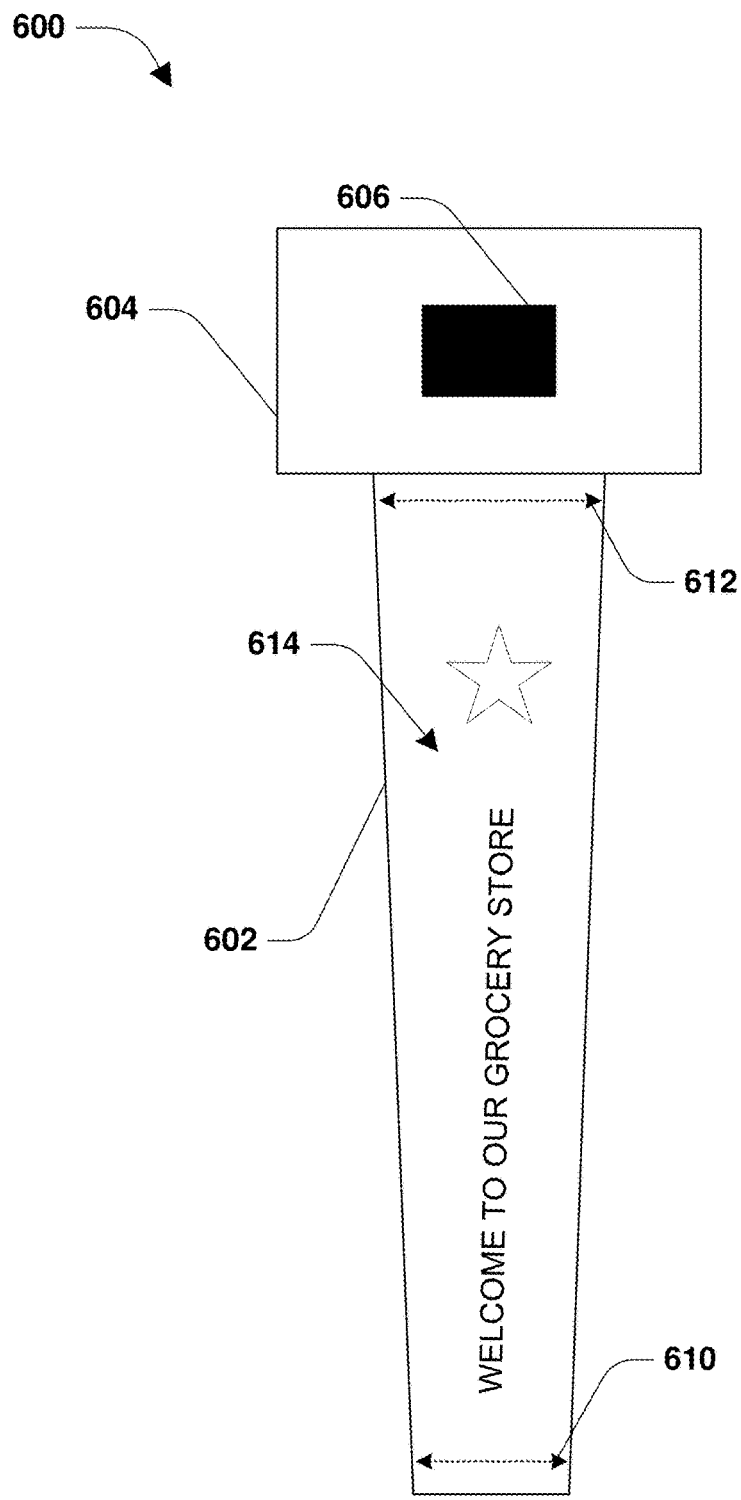
FIG. 6 is a component block diagram illustrating an exemplary personal article holder.

FIG. 6 illustrates an embodiment of a personal article holder 600 that is removably attachable to a shopping cart using one or more attachment means. The personal article holder 600 comprises an elongated body 602 that has a tapered shape, such that a top portion 612 of the elongated body 602 is wider than a bottom portion 610 of the elongated body 602. The personal article holder 600 comprises a lip 604 that overhangs the elongated body 602 and defines a hollow interior 606 into which a personal article can be inserted. A label 614 may be affixed to the elongated body 602 or may be formed as part of the elongated body 602. The label 614 may comprise text and/or imagery, such as a welcome message and a star. In an embodiment, a radio frequency identifier (RFID) tag may be affixed to the personal article holder 600. The RFID tag may be used to track a location of the personal article holder 600, such as to track whether the personal article holder 600 has entered into or exited from a store. Other types of tracking devices and/or identifiers (e.g., a unique identifier for the personal article holder 600 that can be used to identify a particular shopping cart to which the personal article holder 600 is attached) may be affixed to the personal article holder 600. Various other types of information may be attached to the personal article holder 600 using the label 614, such as a QR code or other scan code, which can be scanned using a mobile device of the user in order to launch an application, such as a grocery store application displaying a map of the grocery store, current sales, available coupons, a link to social network page of the grocery store to follow, an ability to sign up for emails or other promotional content, etc. In an embodiment, the label may comprise a digital display configured to display various types of electronic content, such as coupons, promotions, etc. (e.g., the digital display may be housed within a water proof housing affixed to a side of the elongated body 602; the digital display may comprise a flexible display wrapped around the elongated body 602; etc.).

Figure 7:
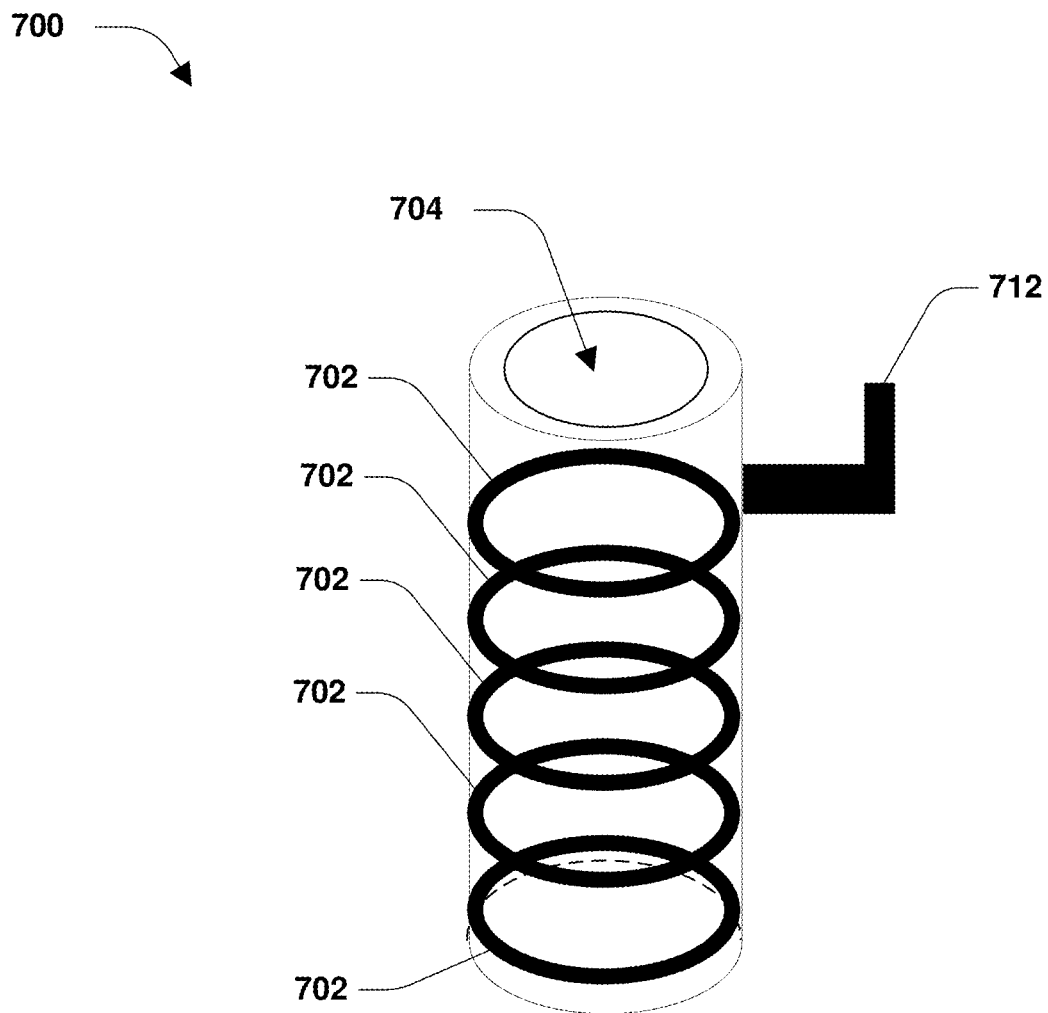
FIG. 7 is a component block diagram illustrating an exemplary personal article holder comprising a plurality of gripping structures.

FIG. 7 illustrates an embodiment of a personal article holder 700 that is removably attachable to a shopping cart using one or more attachment means. The personal article holder 700 may comprise a hook 712. The hook 712 may be attached to any portion of the personal article holder 700. When the personal article holder 700 is attached to a shopping cart, a user may utilize the hook 712 to hang various personal articles, such as a purse, diaper bag, coat, reusable shopping bags, etc., onto the hook 712 for easy transportation. The personal article holder 700 may comprise a plurality of gripping structures 702. The plurality of gripping structures 702 may be positioned radially around a hollow interior 704 of the personal article holder 700 and are longitudinally spaced from one another. In an embodiment, the plurality of gripping structures 702 may comprise rings, as illustrated in FIG. 7. In another embodiment, the plurality of gripping structures 702 may comprise a plurality of nubs lining the inside wall of the hollow interior 704. It may be appreciated that a gripping structure may have any shape and/or configuration. A gripping structure may be comprised of a rubber material, a plastic material, or any other type of material. In this way, the plurality of gripping structures may help secure a personal article inserted into the hollow interior 704 of the personal article holder 700. In another embodiment, the personal article holder 700 does not comprise gripping structures, and instead, an inside surface of the personal article holder 700 is smooth.

Figure 8:
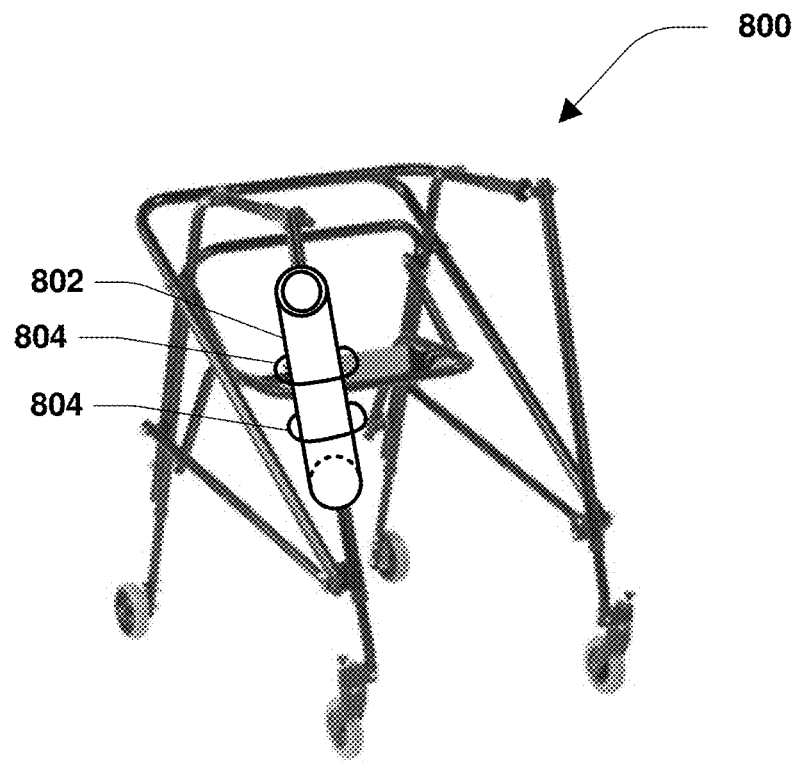
FIG. 8 is a component block diagram illustrating an exemplary personal article holder attached to a mobile device.
Figure 9:
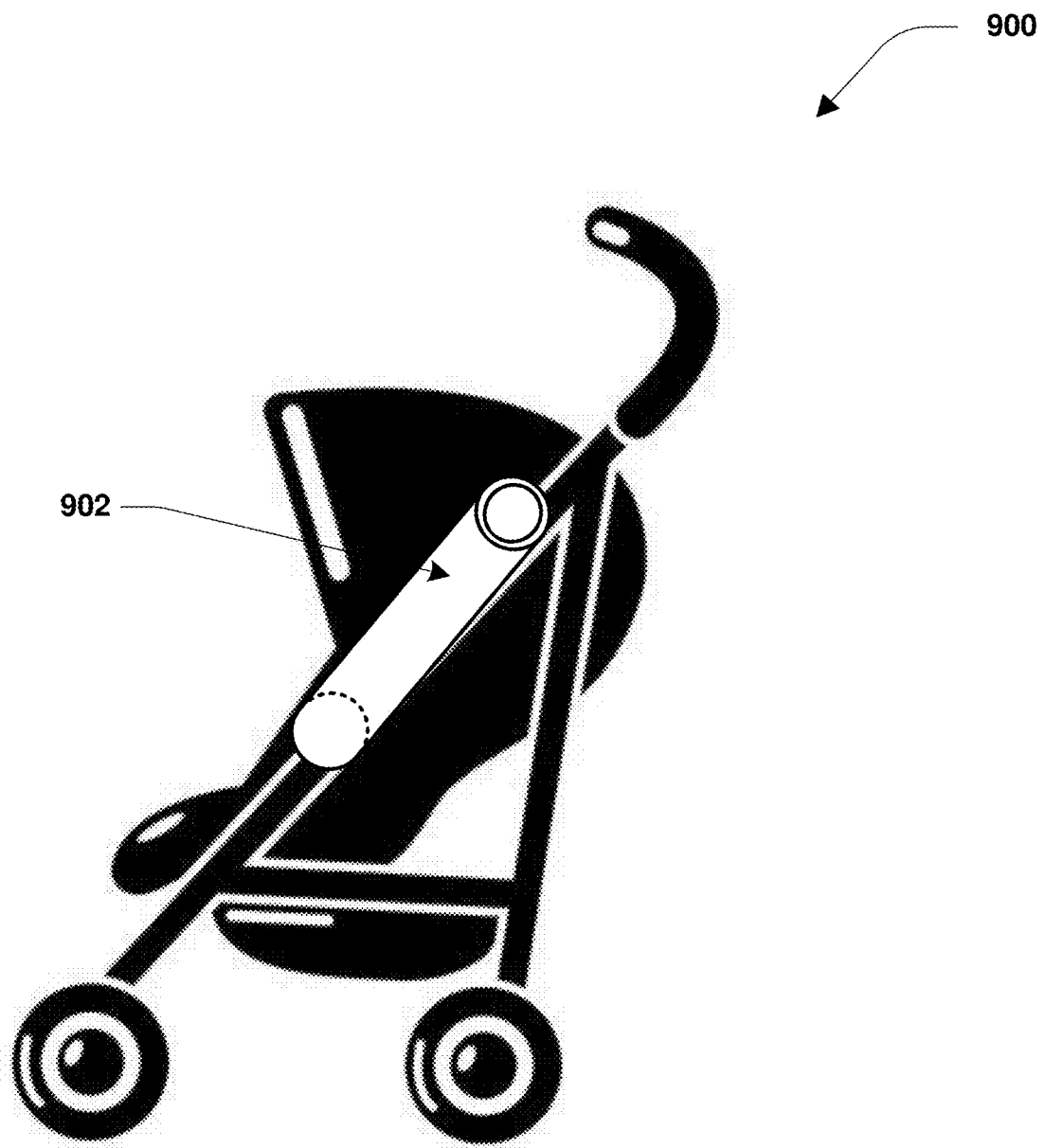
FIG. 9 is a component block diagram illustrating an exemplary personal article holder attached to a mobile device.
Figure 10:
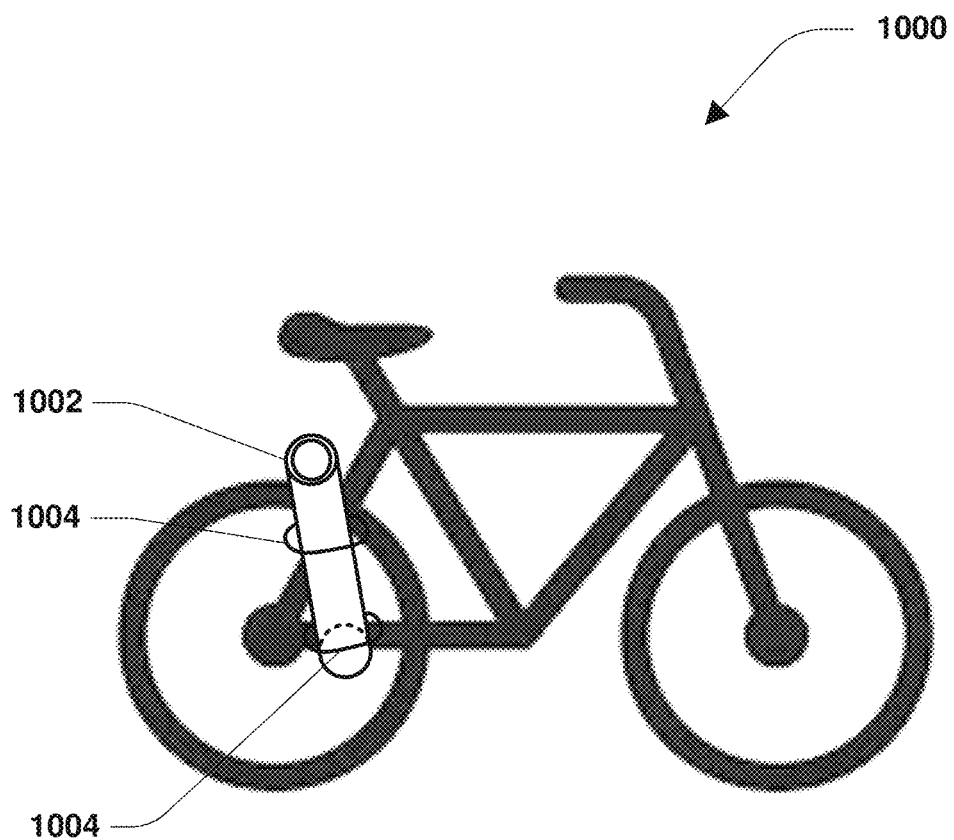
FIG. 10 is a component block diagram illustrating an exemplary personal article holder attached to a mobile device.
Figure 11:
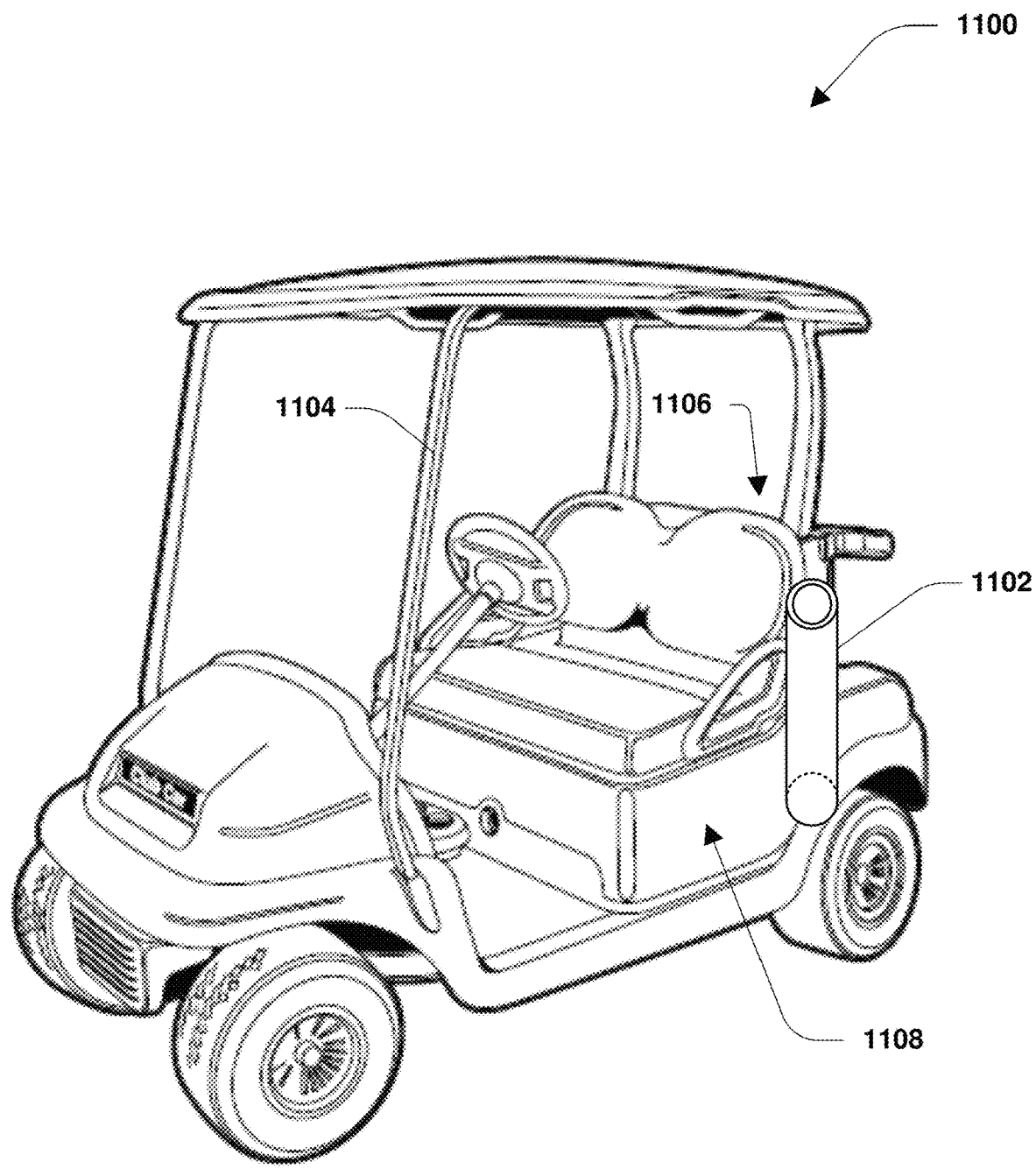
FIG. 11 is a component block diagram illustrating an exemplary personal article holder attached to a mobile device.

It may be appreciated that a personal article holder may be attached to a variety of mobile devices, such as inside a vehicle (e.g., attached to a door, seat, frame, or other portions inside a vehicle), outside the vehicle (e.g., magnetically attached to the outside of a bus), a walker/stroller, a baby stroller, a bike, a scooter, or other mobile device. One or more attachment means may be used to attach the personal article holder to a mobile device, or the personal article holder may be integrated into and is a part of the mobile device. FIG. 8 illustrates a personal article holder 802 attached to a walker 800 by one or more attachment means 804. It may be appreciated that the personal article holder 802 may be attached to any portion of the walker 800 (e.g., a handle structure, support/frame structures, a seat structure, etc.). FIG. 9 illustrates a personal article holder 902 attached to a stroller such as a baby stroller by one or more attachment means. It may be appreciated that the personal article holder 902 may be attached to any portion of the stroller (e.g., a handle structure, support/frame structures, etc.). FIG. 10 illustrates a personal article holder 1002 attached to a bike by one or more attachment means 1004. It may be appreciated that the personal article holder 1002 may be attached to any portion of the bike (e.g., a handle/steering structure, support/frame structures, etc.). FIG. 11 illustrates a personal article holder 1102 attached to a golf cart 1100 by one or more attachment means (e.g., zip ties, nuts and bolts, a weld, straps, etc.). It may be appreciated that the personal article holder 1102 may be attached to any portion of the golf cart 1100 (e.g., a side 1108 of the golf cart 1000, a back side 1106 of the golf cart 1100, a support pole 1104 used to support a roof of the golf car 1100, etc.).

Figure 12:
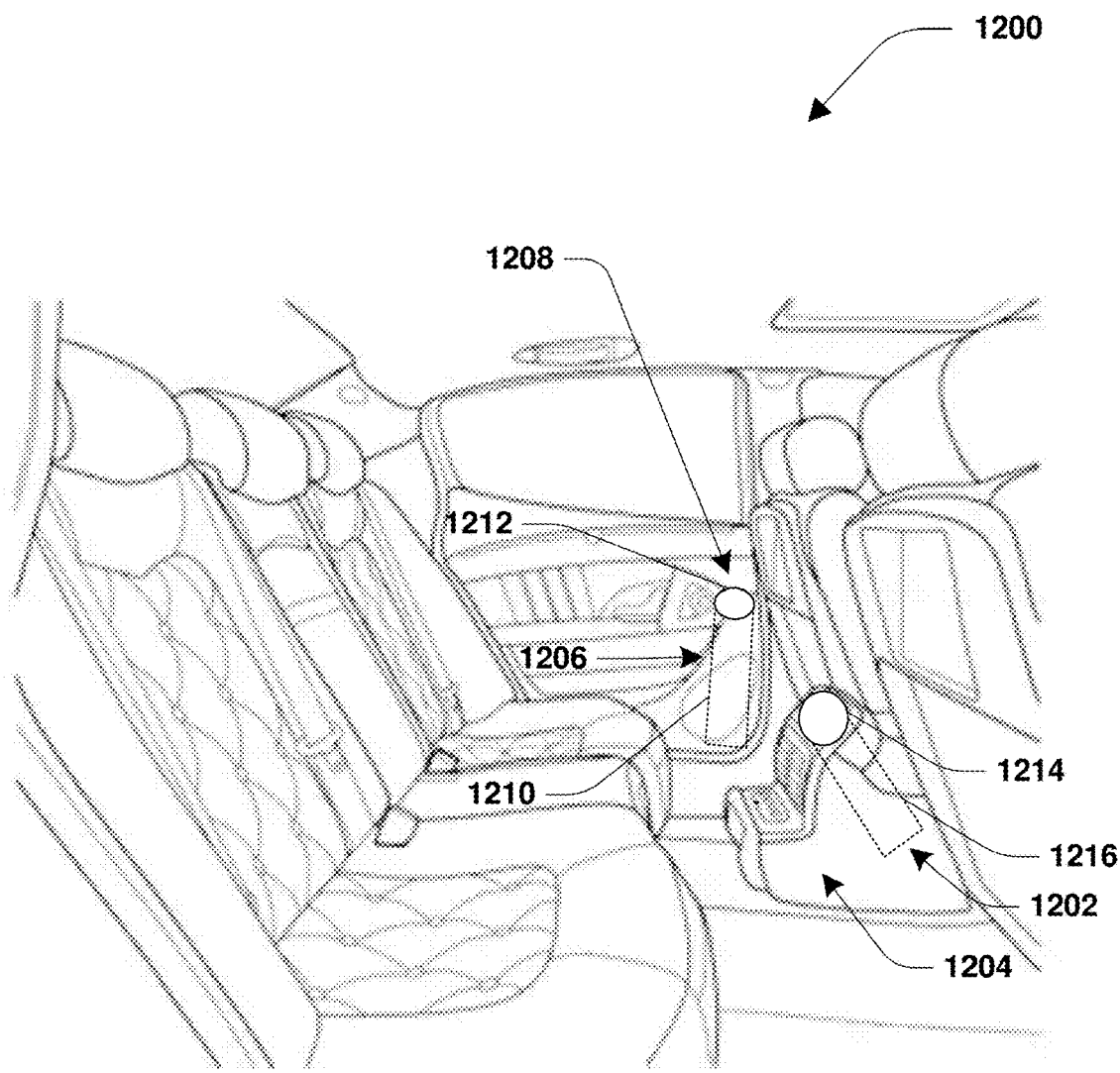
FIG. 12 is a component block diagram illustrating an exemplary personal article holder formed as an integrated mold of a vehicle.

In an embodiment, the personal article holder may be integrated into a mold that is part of an interior of a vehicle, such as a car, van, truck, SUV, etc. (e.g., formed from the same mold of a vehicle door or console). For example, the personal article holder may be an elongated mold or shaft that is part of a door, a console, or other portion of an interior of the vehicle. FIG. 12 illustrates various embodiments of personal article holders integrated into and apart of portions of an interior 1200 of a vehicle. In an example, a first personal article holder 1206 is part of an interior door mold 1208 of a door of the vehicle. The first personal article holder 1206 comprises an opening 1212 into which a cane, umbrella or other item can be inserted. The first personal article holder 1206 comprises an elongated shaft 1210 (an elongated body) that is inside of the interior door mold 1208. In an example, a second personal article holder 1202 is part of an interior console mold 1204 of the vehicle. The second personal article holder 1202 comprises an opening 1214 into which a cane, umbrella or other item can be inserted. The second personal article holder 1202 comprises an elongated shaft 1216 (an elongated body) that is inside of the interior console mold 1204. The elongated shafts 1210 and 1216 of the first personal article holder 1206 and/or the second personal article holder 1202 have a length. In an example, the length is between about 6 inches and about 2 feet. In another example, the length is between about 8 inches and about 16 inches. In yet another example, the length is about 12 inches. It may be appreciated that the elongated shafts may have any length suitable for receiving and holding a particular type of personal article.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A personal article holder in combination with a mobile device, the personal article holder comprising:
   an elongated body having a non-tapered tubular shape and comprising a hollow interior, a first open end configured for allowing a personal article to be inserted into the hollow interior, and a second open end for allowing a portion of the personal article to protrude through the second open end, and a plurality of holes;
   an attachment means comprising a plurality of zip ties that attach the personal article holder to an outside of a basket of the mobile device at an inclined angle wherein the first open end is angled towards a handle of the mobile device, wherein the plurality of zip ties secure the elongated body directly to a vertical bar and a horizontal bar of the basket using zip tie locking levers, wherein each zip tie is inserted thorough at least two respective holes from the plurality of holes of the elongated body; and a label affixed to the personal article holder and comprising at least one of a name of a store or logo of the store.

2. The personal article holder of claim 1, wherein the elongated body has a length of 12 inches.

3. The personal article holder of claim 1, wherein the personal article holder is attached to a plastic housing of the mobile device.

4. A shopping cart comprising:
a basket comprising a bottom basket frame, a front basket frame, a rear basket frame, a first side basket frame, and a second side basket frame;
a basket support structure on which the basket is mounted, wherein the basket support structure comprises a base frame mounted on one or more wheel assemblies and a handle structure operatively connected to the base frame for displacing the shopping cart; and
a personal article holder comprising:
an elongated body having a non-tapered tubular shape comprising: a hollow interior;
a first open end configured for allowing a personal article to be inserted into the hollow interior;
a second open end for allowing a portion of the personal article to protrude through the second open end; and
a plurality of holes;
an attachment means comprising a plurality of zip ties that attach the personal article holder to an outside of the basket at an inclined angle wherein the first open end is angled towards the handle structure, wherein the plurality of zip ties secure the elongated body directly to a vertical bar and a horizontal bar of the basket using zip tie locking levers, wherein each zip tie is inserted thorough at least two respective holes from the plurality of holes of the elongated body; and
a label affixed to the personal article holder and comprising a name of a store and logo of the store.

5. The shopping cart of claim 4, wherein the elongated body has a length of 12 inches.

6. The shopping cart of claim 4, wherein the label comprises a QR code.

7. A personal article holder in combination with a mobile device, the personal article holder comprising:
an elongated body having a non-tapered tubular shape and comprising a hollow interior, a first open end configured for allowing a personal article to be inserted into the hollow interior, and a second open end for allowing a portion of the personal article to protrude through the second open end;

an attachment means comprising a plurality of zip ties that attach the personal article holder to an outside of a basket of the mobile device at an inclined angle wherein the first open end is angled towards a handle of the mobile device, wherein the plurality of zip ties secure the elongated body directly to a vertical bar and a horizontal bar of the basket using zip tie locking levers; and
wherein the elongated body comprises a plurality of gripping structures positioned radially within the hollow interior and being longitudinally spaced from one another;
wherein the plurality of gripping structures comprise rubber rings.

8. The personal article holder of claim 7, comprising:
a hook attached to an outside surface of the personal article holder.

9. A personal article holder in combination with a mobile device, the personal article holder comprising:
a tapered elongated body comprising a hollow interior, a first open end configured for allowing a personal article to be inserted into the hollow interior, and a plurality of holes;
an attachment means comprising a plurality of zip ties that attach the personal article holder to an outside of a basket of the mobile device at an inclined angle wherein the first open end is angled towards a handle of the mobile device, wherein the plurality of zip ties secure the elongated body directly to a vertical bar and a horizontal bar of the basket using zip tie locking levers wherein each zip tie is inserted thorough at least two respective holes from the plurality of holes of the elongated body; and
a label affixed to the personal article holder and comprising at least one of a name of a store or logo of the store.

10. The personal article holder of claim 9, wherein the label comprises an RFID or QR code.

11. The personal article holder of claim 10, wherein the QR code comprises a scan code configured to launch an application on a device to display at least one of a map of the store, a coupon, an ability to sign up for emails, or current sales of the store.

12. The personal article holder of claim 10, wherein the RFID tag is configured to track whether the mobile device has entered or exited the store.

13. The personal article holder of claim 10, wherein the QR code comprises a scan code configured to launch an application on a device.

* * * * *